(12) United States Patent
Geng et al.

(10) Patent No.: US 12,541,463 B2
(45) Date of Patent: Feb. 3, 2026

(54) HARDWARE BASED ADDRESS SANITIZER FOR EMBEDDED SYSTEMS

(71) Applicant: QUALCOMM Incorporated, San Diego, CA (US)

(72) Inventors: Norris Geng, San Diego, CA (US); Gurvinder Singh Chhabra, San Diego, CA (US); Richard Senior, San Diego, CA (US); Suresh Kumar Venkumahanti, Austin, TX (US); Christopher Koob, Round Rock, TX (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/636,044

(22) Filed: Apr. 15, 2024

(65) Prior Publication Data
US 2025/0321895 A1    Oct. 16, 2025

(51) Int. Cl.
*G06F 12/10* (2016.01)
*G06F 12/0811* (2016.01)

(52) U.S. Cl.
CPC .......... *G06F 12/10* (2013.01); *G06F 12/0811* (2013.01)

(58) Field of Classification Search
CPC ................. G06F 12/10; G06F 12/0811; G06F 2212/1052
USPC .......................................................... 711/105
See application file for complete search history.

(56) References Cited

U.S. PATENT DOCUMENTS

| | | | |
|---|---|---|---|
| 2022/0206767 A1* | 6/2022 | Lee | G06F 21/577 |
| 2024/0095174 A1* | 3/2024 | Kwon | G06F 12/0871 |

* cited by examiner

*Primary Examiner* — Hua J Song
(74) *Attorney, Agent, or Firm* — Seyfarth Shaw LLP

(57) ABSTRACT

An apparatus has a data memory region with multiple data symbols and inaccessible zones, a first inaccessible zone placed before each data symbol and a second inaccessible zone placed after each data symbol. The apparatus also has a shadow memory region corresponding to the data memory region. The shadow memory region includes multiple data elements. Each data element corresponds to one of the data symbols or inaccessible zones and indicates an accessibility state of the corresponding data symbol or inaccessible zone. The apparatus includes an address sanitizer hardware block within a processing core and coupled to the shadow memory region. The address sanitizer hardware block checks a selected data element of the shadow memory region, corresponding to a selected data symbol or inaccessible zone being accessed, to determine the accessibility state of the selected data symbol or inaccessible zone, prior to accessing the selected data symbol or inaccessible zone.

20 Claims, 8 Drawing Sheets

700 —▸

```
CHECK A SELECTED DATA ELEMENT OF A SHADOW MEMORY
REGION CORRESPONDING TO EITHER A SELECTED DATA          — 702
SYMBOL OR INACCESSIBLE ZONE BEING ACCESSED

A DATA MEMORY REGION COMPRISES MULTIPLE DATA SYMBOLS
AND MULTIPLE INACCESSIBLE ZONES

A FIRST INACCESSIBLE ZONE IS PLACED BEFORE EACH DATA
SYMBOL AND A SECOND INACCESSIBLE ZONE PLACED AFTER
EACH DATA SYMBOL

THE SHADOW MEMORY REGION CORRESPONDS TO THE DATA
MEMORY REGION AND INCLUDES MULTIPLE DATA ELEMENTS

EACH DATA ELEMENT CORRESPONDS TO ONE OF THE DATA
SYMBOLS OR ONE OF THE INACCESSIBLE ZONES

EACH DATA ELEMENT INDICATES AN ACCESSIBILITY STATE OF
THE CORRESPONDING DATA SYMBOL OR INACCESSIBLE ZONE
```

```
DETERMINE THE ACCESSIBILITY STATE OF THE SELECTED DATA
SYMBOL OR INACCESSIBLE ZONE BASED ON THE CHECKING,      — 704
PRIOR TO ACCESSING THE SELECTED DATA SYMBOL OR
INACCESSIBLE ZONE
```

*FIG. 7*

HARDWARE BASED ADDRESS SANITIZER FOR EMBEDDED SYSTEMS

BACKGROUND

Field

Aspects of the present disclosure relate to computing devices, and more specifically to a hardware based address sanitizer (ASAN) for embedded systems.

Background

Mobile or portable computing devices include mobile phones, laptop, palmtop and tablet computers, portable digital assistants (PDAs), portable game consoles, and other portable electronic devices. Mobile computing devices include many electrical components that consume power and generate heat. The components (or compute devices) may include system-on-a-chip (SoC) devices, graphics processing unit (GPU) devices, neural processing unit (NPU) devices, digital signal processors (DSPs), and modems, among others. The components may also include embedded systems, which are a combination of hardware and software components dedicated to a specific task.

Software programming bugs in embedded systems, for example out-of-bounds memory access, may cause software run stability issues, and may also create security vulnerabilities that can be exploited for hacking the embedded systems. An address sanitizer (ASAN) is a software solution designed to catch these bugs at runtime. Memory tagging extension (MTE) is another solution to catch these types of bugs. These solutions, however, come with costs that may not be desirable for embedded systems. These costs may include, but are not limited to, large central processing unit (CPU) loading times, memory overhead, and high hardware specifications. It would be desirable to have a more efficient system to catch out-of-bounds access.

SUMMARY

Aspects of the present disclosure are directed to an apparatus. The apparatus has a data memory region comprising multiple data symbols and multiple inaccessible zones, a first inaccessible zone placed before each data symbol and a second inaccessible zone placed after each data symbol. The apparatus also has a shadow memory region corresponding to the data memory region. The shadow memory region includes multiple data elements, each data element corresponding to one of the data symbols or one of the inaccessible zones. Each data element indicates an accessibility state of the corresponding data symbol or inaccessible zone. The apparatus also has an address sanitizer hardware block within a processing core and coupled to the shadow memory region. The address sanitizer hardware block is configured to check a selected data element of the shadow memory region corresponding to a selected data symbol or inaccessible zone being accessed, in order to determine the accessibility state of the selected data symbol or inaccessible zone, prior to accessing the selected data symbol or inaccessible zone.

In aspects of the present disclosure, a method implemented by an address sanitizer hardware block includes checking a selected data element of a shadow memory region corresponding to a selected data symbol or inaccessible zone being accessed. A data memory region comprises multiple data symbols and multiple inaccessible zones. A first inaccessible zone is placed before each data symbol and a second inaccessible zone placed after each data symbol. The shadow memory region corresponds to the data memory region. The shadow memory region includes multiple data elements. Each data element corresponds to one of the data symbols or one of the inaccessible zones. Each data element indicates an accessibility state of the corresponding data symbol or inaccessible zone. The method also includes determining the accessibility state of the selected data symbol or inaccessible zone based on the checking, prior to accessing the selected data symbol or inaccessible zone.

Other aspects of the present disclosure are directed to an apparatus. The apparatus has at least one memory and one or more processors coupled to the at least one memory. The processor(s) is configured to check a selected data element of a shadow memory region (of the at least one memory) corresponding to either a selected data symbol or inaccessible zone being accessed. A data memory region (of the at least one memory) comprises multiple data symbols and multiple inaccessible zones, a first inaccessible zone placed before each data symbol and a second inaccessible zone placed after each data symbol. The shadow memory region corresponds to the data memory region. The shadow memory region includes multiple data elements. Each data element corresponds to one of the data symbols or one of the inaccessible zones. Each data element indicates an accessibility state of the corresponding data symbol or inaccessible zone. The processor(s) is also configured to determine the accessibility state of the selected data symbol or inaccessible zone based on the checking, prior to accessing the selected data symbol or inaccessible zone.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

FIG. 7 is a flow diagram illustrating an example process performed, for example, by a mobile device, in accordance with various aspects of the present disclosure.

DETAILED DESCRIPTION

Figure 1:
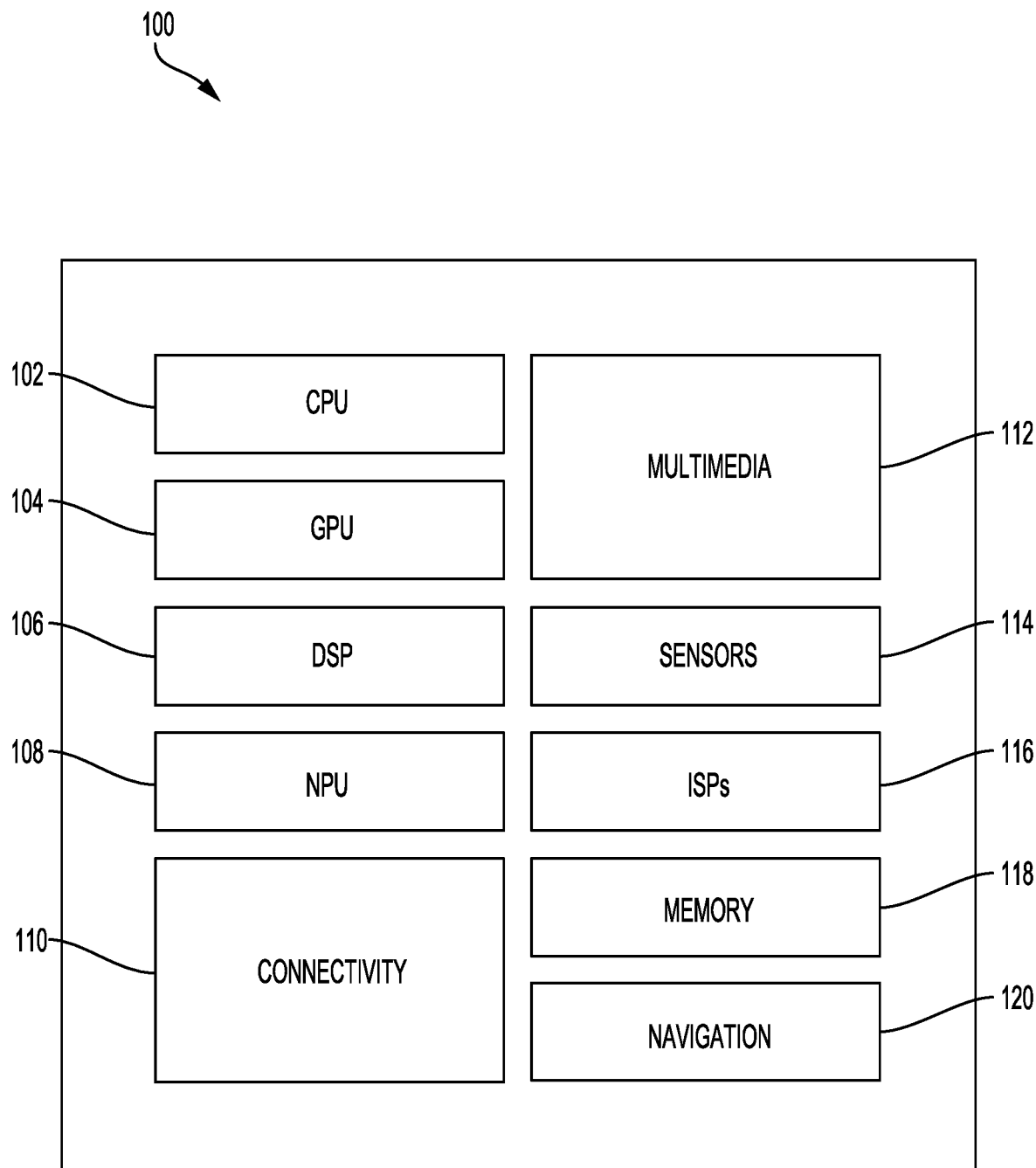
FIG. 1 illustrates an example implementation of a host system-on-a-chip (SoC), including an address sanitizer hardware engine, in accordance with certain aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. It will be apparent, however, to those skilled in the art that these concepts may be practiced without these specific details. In some instances, well-known structures and components are shown in block diagram form in order to avoid obscuring such concepts.

As described, the use of the term "and/or" is intended to represent an "inclusive OR," and the use of the term "or" is intended to represent an "exclusive OR." As described, the term "exemplary" used throughout this description means "serving as an example, instance, or illustration," and should not necessarily be construed as preferred or advantageous over other exemplary configurations. As described, the term "coupled" used throughout this description means "connected, whether directly or indirectly through intervening connections (e.g., a switch), electrical, mechanical, or otherwise," and is not necessarily limited to physical connections. Additionally, the connections can be such that the objects are permanently connected or releasably connected. The connections can be through switches. As described, the term "proximate" used throughout this description means "adjacent, very near, next to, or close to." As described, the term "on" used throughout this description means "directly on" in some configurations, and "indirectly on" in other configurations.

Software programming bugs in embedded systems, for example out-of-bounds memory access, may cause software run stability issues, and may also create security vulnerabilities that can be exploited for hacking the embedded systems. An address sanitizer (ASAN) is a software solution designed to catch these bugs at runtime. Memory tagging extension (MTE) is another solution to catch these types of bugs. These solutions, however, come with costs that are not desirable for embedded system in terms of large central processing unit (CPU) loading times, memory overhead, and high hardware specifications. It would be desirable to have a more efficient system to catch out-of-bounds access.

Aspects of the present disclosure introduce an address sanitizer hardware engine/block. The address sanitizer hardware engine includes a shadow memory region reserved to maintain a status of a region of data stored in off-chip memory, such as double data rate (DDR) synchronous dynamic random access memory (SDRAM). According to these aspects, a number (N) of bits in the shadow memory control behavior of a data symbol inside the data region.

The address sanitizer hardware block is part of the data fetching path and data writing path. When a central processing unit (CPU) reads from or writes to a cache line in a data buffer, the ASAN hardware block checks the corresponding shadow memory bits in the shadow memory and confirms the accessibility of the cache line. The address sanitizer hardware block converts physical addresses of the data region to addresses in the shadow memory and then determines a state of the memory for the data region (e.g., cache line) to prevent out-of-bounds accesses. The address sanitizer hardware block generates an exception in case the cache line is marked inaccessible.

Particular aspects of the subject matter described in this disclosure can be implemented to realize one or more of the following potential advantages. In some examples, the described techniques, such as implementing a hardware based address sanitizer block may prevent out-of-bounds access attempts in embedded systems with reduced overhead.

FIG. 1 illustrates an example implementation of a host system-on-a-chip (SoC) 100, which includes an address sanitizer hardware engine, in accordance with aspects of the present disclosure. The host SoC 100 includes processing blocks tailored to specific functions, such as a connectivity block 110. The connectivity block 110 may include fifth generation (5G) connectivity, fourth generation long term evolution (4G LTE) connectivity, Wi-Fi connectivity, universal serial bus (USB) connectivity, Bluetooth® connectivity, Secure Digital (SD) connectivity, and the like.

In this configuration, the host SoC 100 includes various processing units that support multi-threaded operation. For the configuration shown in FIG. 1, the host SoC 100 includes a multi-core central processing unit (CPU) 102, a graphics processor unit (GPU) 104, a digital signal processor (DSP) 106, and a neural processor unit (NPU) 108. The host SoC 100 may also include a sensor processor 114, image signal processors (ISPs) 116, a navigation module 120, which may include a global positioning system (GPS), and a memory 118. The multi-core CPU 102, the GPU 104, the DSP 106, the NPU 108, and the multi-media engine 112 support various functions such as video, audio, graphics, gaming, artificial networks, and the like. Each processor core of the multi-core CPU 102 may be a reduced instruction set computing (RISC) machine, an advanced RISC machine (ARM), a microprocessor, or some other type of processor. The NPU 108 may be based on an ARM instruction set.

According to aspects of the present disclosure, a mobile device includes an address sanitizer (ASAN) hardware engine. The address sanitizer hardware engine may include means for checking, means for determining, means for converting, means for generating, and mean for instructing. In one configuration, the checking means, the determining means, the converting means, the generating means, and the instructing means may be the CPU 102, GPU 104, DSP 106, NPU 108, and/or memory 118 as shown in FIG. 1. In other aspects, the aforementioned means may be any structure or any material configured to perform the functions recited by the aforementioned means.

Software programming bugs in embedded systems may cause software run stability issues, and may also create security vulnerabilities that can be exploited to hack the embedded systems. These bugs may cause stack and heap buffer overflow and underflow conditions. A stack is a static memory buffer that operates in accordance with a last in first out (LIFO) principle. A heap is a dynamic memory buffer used during runtime of a software program. Software errors, such as heap use after executing a free function and/or a double free function may also raise issues for embedded systems. Similarly, a static buffer overflow may present issues.

These issues cause software runtime instability. Moreover, the bugs cause security vulnerabilities that may be exploited. An address sanitizer (ASAN) is a software solution designed to catch these bugs at runtime. Memory tagging extension (MTE) is another solution to catch these types of bugs. These solutions, however, come with costs that are not embedded system friendly in terms of large central processing unit (CPU) loading times, memory overhead, and high hardware specifications, such as a 64 bit instruction set.

Aspects of the present disclosure introduce an address sanitizer hardware engine. The address sanitizer hardware engine includes a shadow memory region reserved to maintain a status of a region of data stored in off-chip memory, such as double data rate (DDR) synchronous dynamic random access memory (SDRAM). According to these aspects, a number (N) of bits in the shadow memory control behavior of a data symbol inside the data region. The location of the N bits for a cache line inside the data region may be calculated linearly from addresses of the data. That is, a start address of the data is known, and thus, the locations may be calculated based on the start address. Each data symbol may be padded so that the data symbol aligns with boundaries of a cache line.

Figure 2:
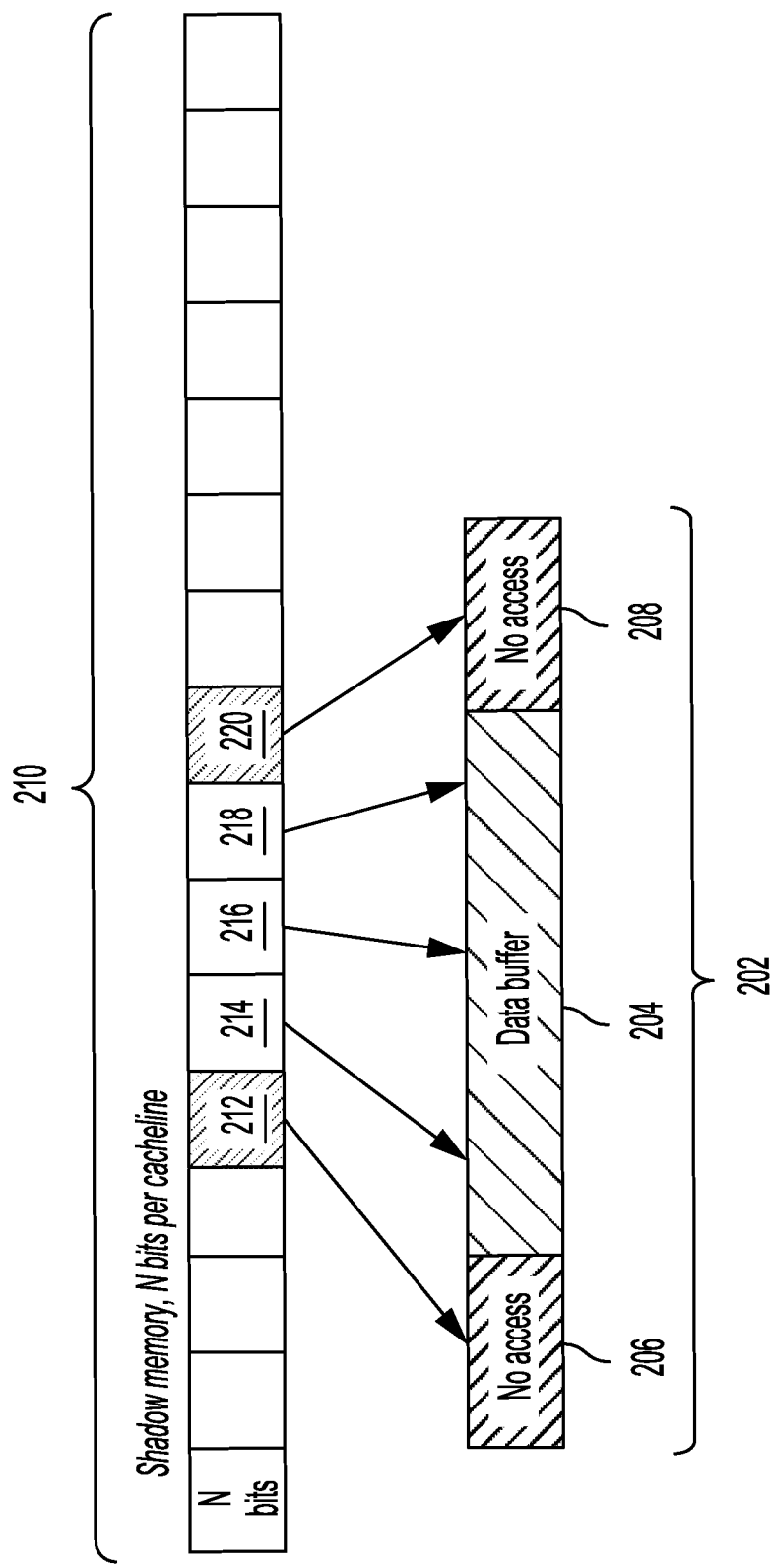
FIG. 2 is a block diagram illustrating a cache line and corresponding shadow memory for an address sanitizer (ASAN) hardware engine, in accordance with various aspects of the present disclosure.

FIG. 2 is a block diagram illustrating a cache line and corresponding shadow memory for an address sanitizer (ASAN) hardware engine, in accordance with various aspects of the present disclosure. In the example of FIG. 2, memory includes a data region 202 and a region of shadow memory 210. The memory may be DDR memory, in some implementations. The data region 202 includes a data buffer 204 storing a data symbol and two no access regions 206, 208. The no access regions 206, 208 protect the data buffer 204, preventing overruns into a next buffer region. In the example of FIG. 2, the data buffer 204 is padded to evenly match a cache line. The alignment may be with the front, end, or both sides of the cache line. A first no access region 206 has a size (X) and is inserted before the data symbol in the data buffer 204. A second no access region 208 has a size (Y) and is inserted after the data symbol in the data buffer 204. The values X and Y are integers and may or may not be equal to one another.

Shadow memory bits 212, 214, 216, 218, 220 correspond to portions of the data region 202 and indicate accessibility of the data in the data region 202. Only some of the shadow memory bits 212, 214, 216, 218, 220 are labeled in FIG. 2 for ease of illustration. A number (N) of the shadow memory bits 214, 216, 218, 220 in the shadow memory 210 control behavior of a data symbol inside the data region 202. In some implementations, two bits of the shadow memory 210 correspond to 64 bytes of the data region 202, such that the shadow memory 210 has a same structure as the data region 202, but is compressed. By checking the shadow memory 210, which may be stored on-chip in a shadow cache in some implementations, the data buffer 204 in the DDR need not be checked on every memory access, thereby improving memory access speed. The shadow memory 210 may be stored in the shadow cache when first reading from the shadow memory 210.

The shadow memory bit 212 corresponding to the no access region 206 and the shadow memory bit 220 corresponding to the no access region 208 indicate the no access regions 206, 208 are not accessible. The shadow memory bits 214, 216, 218 corresponding to the data symbol inside the data buffer 204 indicate the data buffer 204 is accessible.

For a static data symbol (e.g., in a memory stack) padding the symbols to the cache line boundary, inserting the no access bytes, and marking the shadow memory is performed by a compiler at compilation time. For dynamically allocated memory (e.g., a heap buffer), a heap library pads the symbols to the cache line boundary, inserts the no access bytes, and marks the shadow memory.

Figure 3:
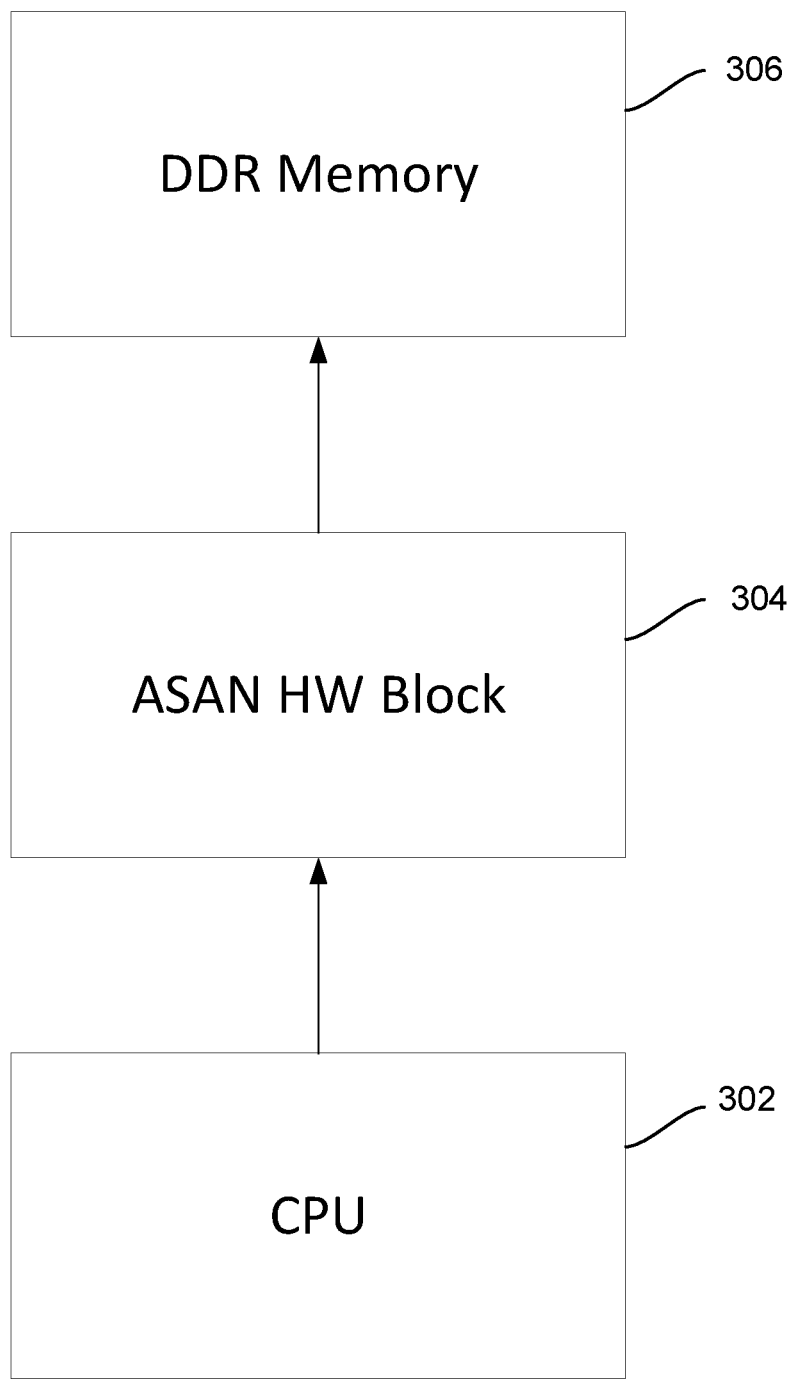
FIG. 3 is a block diagram illustrating an address sanitizer (ASAN) hardware block in a data access path, in accordance with to various aspects of the present disclosure.

FIG. 3 is a block diagram illustrating an address sanitizer (ASAN) hardware (HW) block in a data access path, according to various aspects of the present disclosure. In the example of FIG. 3, a central processing unit (CPU) 302 accesses a memory 306 (e.g., DDR memory) via an address sanitizer hardware block 304. The address sanitizer hardware block 304 is part of the data fetching path and data writing path. When the CPU 302 reads from or writes to a cache line, the ASAN hardware block 304 checks the corresponding shadow memory bits and confirms the accessibility of this cache line. The address sanitizer hardware block 304 converts physical addresses of the data region to addresses in the shadow memory, and then determines a state of the memory for the data region (e.g., cache line) to catch out-of-bounds accesses. The address sanitizer hardware block 304 generates an exception in case the cache line is marked inaccessible. The address sanitizer hardware block 304 may perform the check asynchronously to avoid blocking the data read or write process. In some aspects, the check may be implemented as a best effort so that requests to check accessibility can be dropped when system load is too heavy. The ASAN hardware block 304 provides a programmable interface allowing software to change the state of the no access regions to accessible or inaccessible, as appropriate. For example, a heap library can program the shadow memory corresponding to the no access regions around an allocated block during heap allocate and free operations.

The number (N) of bits corresponding to each cache line can be configured. In some implementations, one bit marks the corresponding cache line as accessible or not accessible. Additional bits may be configured in other implementations. For example, another bit may indicate whether a cache line has ever been accessed. This option helps to profile whether all cache lines in the system are effectively used, so memory usage may be optimized.

The ASAN hardware block may support multiple shadow regions to cover multiple data regions. The ASAN hardware block may be configured differently for each region.

The proposed solution reduces overhead on embedded systems compared to a pure software implementation. From a memory perspective, the overhead comes from the shadow memory, where N bits are allocated for each cache line. With this solution, the overhead is calculated by N bits*X MB/cache line size, which is relatively small for an embedded system. The overhead of accessibility checking occurs in hardware asynchronously and has low impact on system performance, which is often critical to embedded systems.

Figure 4:
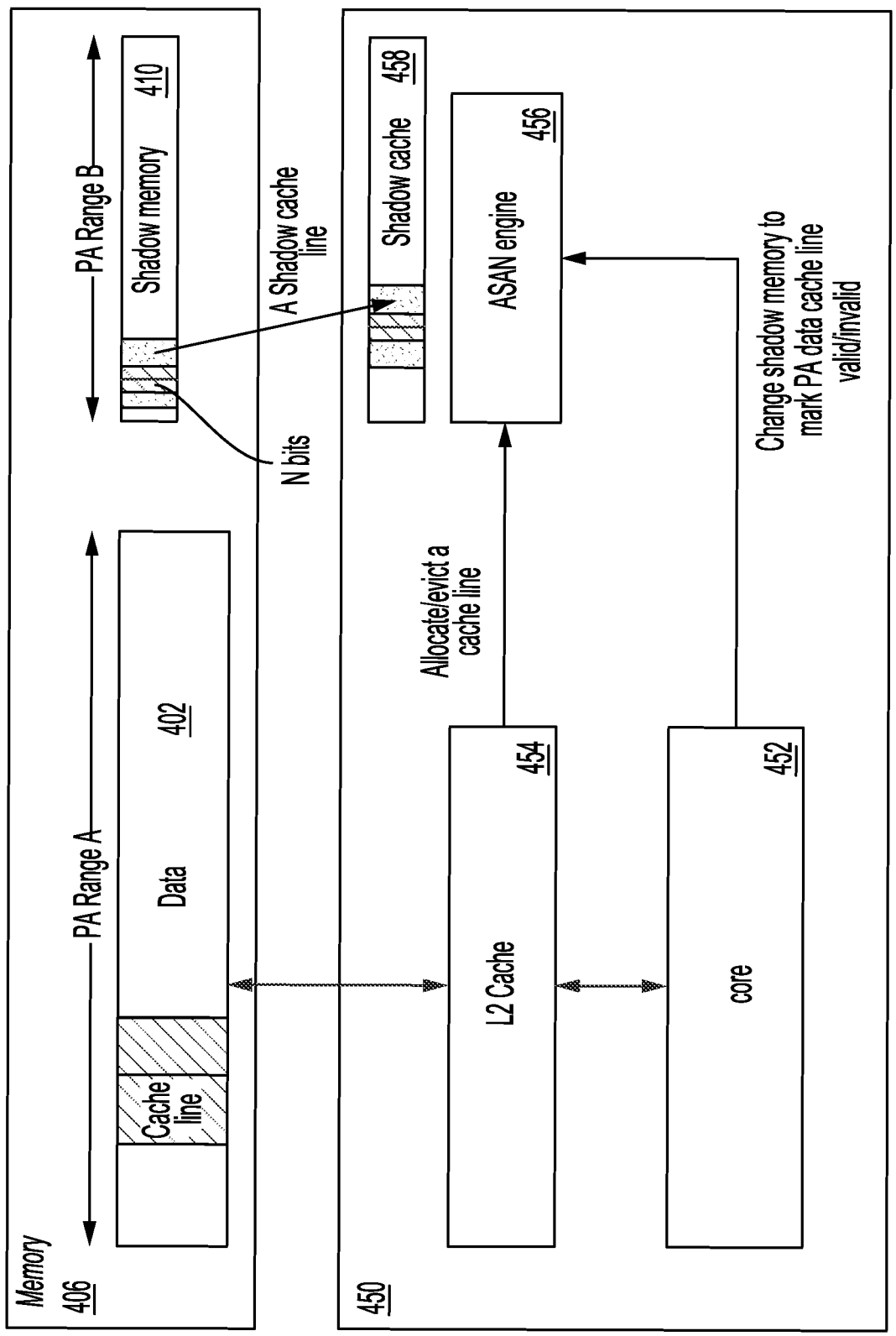
FIG. 4 is a block diagram illustrating an address sanitizer (ASAN) hardware engine and micro-architecture, in accordance with various aspects of the present disclosure.

FIG. 4 is a block diagram illustrating an address sanitizer (ASAN) hardware engine and micro-architecture, in accordance with various aspects of the present disclosure. In the example of FIG. 4, a memory 406 (e.g., the DDR memory 306 of FIG. 3) includes a reserved data region 402 and a region of shadow memory 410. A tag of N bits in the shadow memory 410 marks the accessibility of one cache line (e.g., 64 bytes) in the reserved data region 402. The reserved data region 402 has a physical address (PA) range A, and the shadow memory 410 has a physical address range B.

A CPU 450 (e.g., the CPU 302 of FIG. 3) includes a processor core 452, a level 2 (L2) cache 454, and an ASAN hardware engine 456 (e.g., the address sanitizer hardware block 304 of FIG. 3). A shadow cache 458 may also be included. When the L2 cache 454 allocates or evicts a data cache line, the L2 cache 454 sends a request to the ASAN hardware engine 456 to check the accessibility of the cache line, including the physical address of the data to be checked. The ASAN hardware engine 456 may skip the check if the check would interfere with operations of the embedded device.

The ASAN hardware engine 456 loads the shadow cache line corresponding to the data cache line address into the shadow cache 458 and checks the N bits tag. Example bits for a 2-bit tag may be 00 for a valid un-accessed data region, 01 for a valid read from data region, 10 for a valid written-to data region, and 11 for an invalid data region. The ASAN hardware engine 456 generates an exception if the tag indicates the data cache line being accessed is inaccessible. The processor core 452 may change the shadow memory 410 to mark physical addresses of the data cache line as accessible or inaccessible (e.g., valid/invalid) in accordance with changes to the reserved data region 402, as described with respect to FIGS. 5 and 6.

Figure 5:
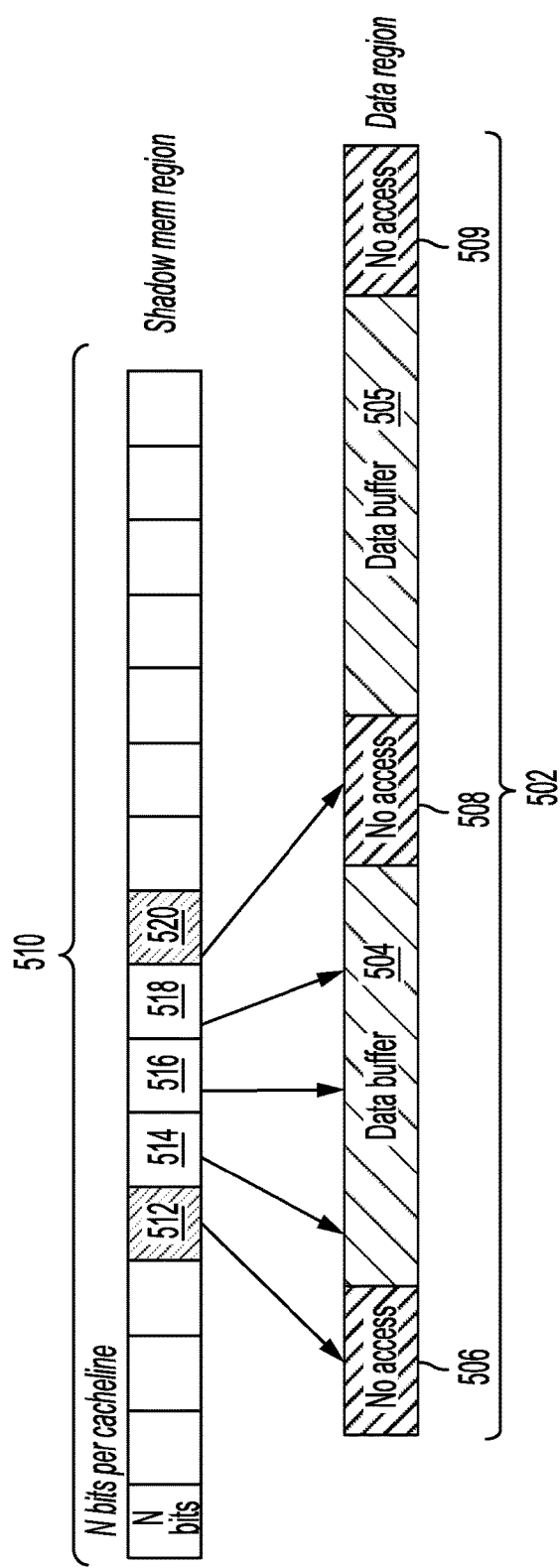
FIG. 5 is a block diagram illustrating a cache line and corresponding shadow memory for an address sanitizer (ASAN) hardware engine for static symbols, in accordance with various aspects of the present disclosure.

FIG. 5 is a block diagram illustrating a cache line and corresponding shadow memory for an address sanitizer hardware engine for static symbols, in accordance with various aspects of the present disclosure. In the example of FIG. 5, memory is allocated for a data region 502 and a region of shadow memory 510. The memory may be DDR memory, in some implementations. The data region 502 includes data buffers 504, 505 storing data symbols. The data region 502 also includes no access regions 506, 508, 509. The no access regions 506, 508, 509 protect the data buffers 504, 505, preventing overruns into a next buffer region. In the example of FIG. 5, the data buffers 504, 505 are padded to evenly match cache lines.

Shadow memory bits 512, 514, 516, 518, 520 correspond to portions of the data region 502 and indicate accessibility of the data in the data buffers 504, 505. Only some of the shadow memory bits 512, 514, 516, 518, 520 are labeled in FIG. 5 for ease of illustration.

A compiler aligns the data symbols at cache line boundaries and inserts padding cache lines between the symbols. The compiler initializes the shadow memory 510 and marks shadow memory bits 514, 516, 518 corresponding to the cache lines in the data buffers 504, 505 as accessible and the shadow memory bits 512, 520 corresponding to the no access regions 506, 508, 509 as inaccessible (the shadow memory bits corresponding to the data buffer 505 and the no access region 509 are not shown).

Figure 6:
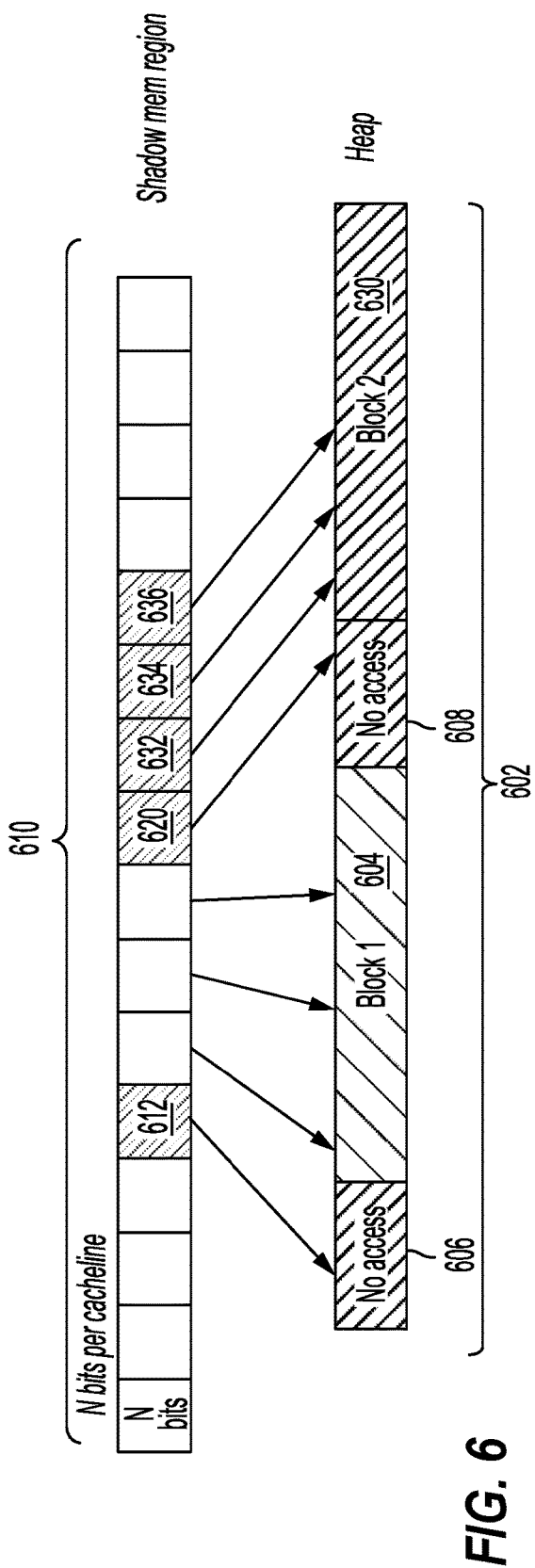
FIG. 6 is a block diagram illustrating a cache line and corresponding shadow memory for an address sanitizer (ASAN) hardware engine for heap applications, in accordance with various aspects of the present disclosure.

FIG. 6 is a block diagram illustrating a cache line and corresponding shadow memory for an address sanitizer hardware engine for heap applications, in accordance with various aspects of the present disclosure. As shown in FIG. 6, memory is allocated for a heap region 602 and a region of shadow memory 610. In the example of FIG. 6, for heap memory overrun protection, a heap library allocates block 1 604 of the heap region 602 and appends no access regions (e.g., padding cache lines) 606, 608 at the beginning and end of block 1 604. The heap library marks the corresponding shadow memory bits 612, 620 for the no access regions 606, 608 as inaccessible. In order to protect a memory segment (e.g., block 2 630) after freeing the memory segment, the heap library frees block 2 630 and marks the corresponding shadow memory bits 632, 634, 636 for cache lines in block 2 630 as inaccessible. Thus, error conditions caused by later accessing the freed memory segment (e.g., block 2 630) are prevented.

FIG. 7 is a flow diagram illustrating an example process 700 performed, for example, by a mobile device, in accordance with various aspects of the present disclosure. The example process 700 is an example of address sanitizer hardware block operations. As shown in FIG. 7, in some aspects, the process 700 may include checking a selected data element of a shadow memory region corresponding to either a selected data symbol or inaccessible zone being accessed. A data memory region comprises multiple data symbols and multiple inaccessible zones, a first inaccessible zone placed before each data symbol and a second inaccessible zone placed after each data symbol. The shadow memory region corresponds to the data memory region. The shadow memory region includes multiple data elements. Each data element corresponds to one of the data symbols or one of the inaccessible zones. Each data element indicates an accessibility state of the corresponding data symbol or inaccessible zone (block 702). In some aspects, the shadow memory resides in cache memory of the processing core. Each of the data symbols may corresponds to a data cache line.

In some aspects, the process may include determining the accessibility state of the selected data symbol or inaccessible zone based on the checking, prior to accessing the selected data symbol or inaccessible zone (block 704). The address sanitizer hardware block may be configured to generate an exception in response to determining the accessibility state indicates inaccessibility. The processing core may be configured to instruct the address sanitizer hardware block to update the accessibility state of the selected data symbol in response to the data memory region being dynamic memory.

Figure 8:
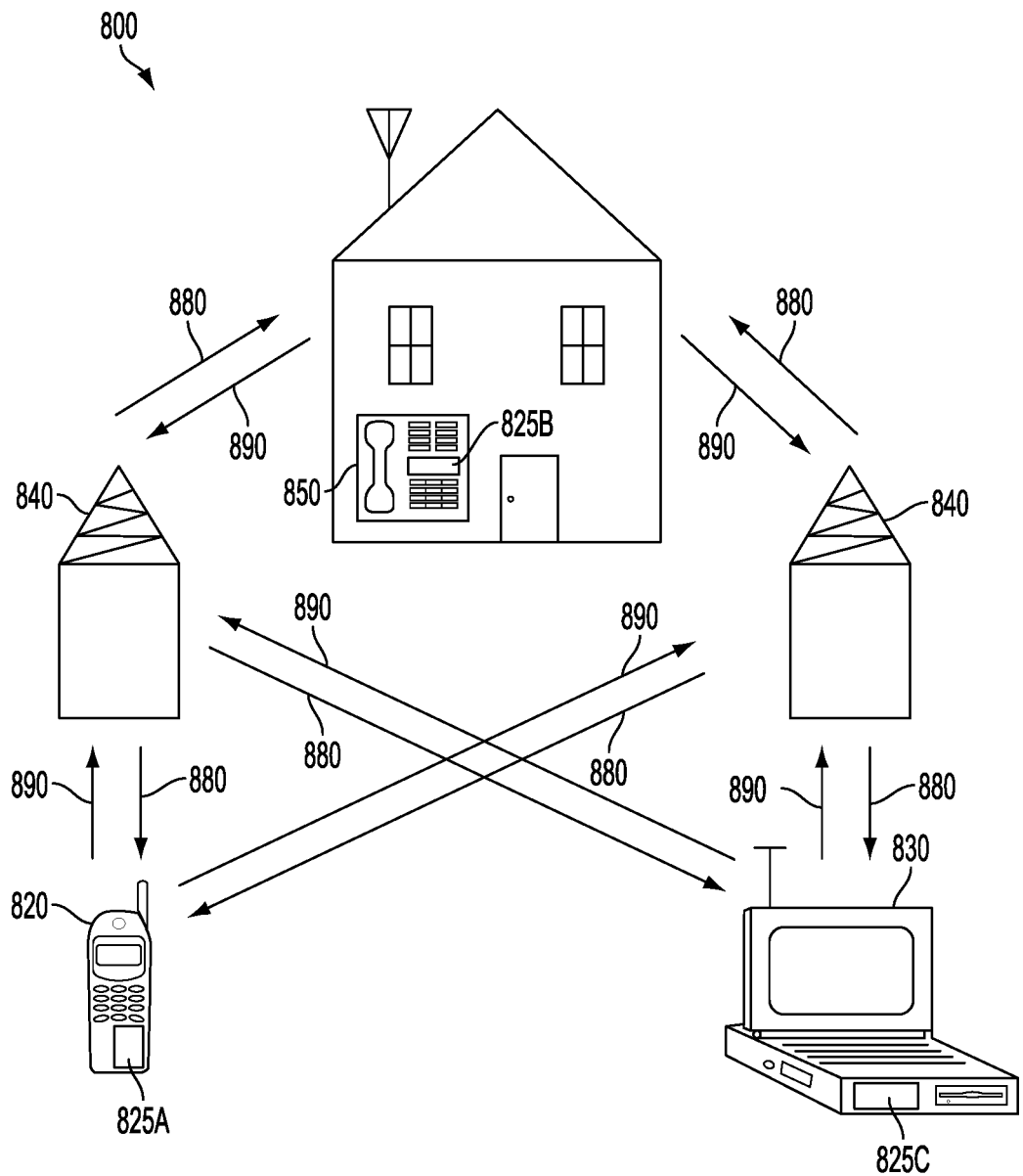
FIG. 8 is a block diagram showing an exemplary wireless communications system in which a configuration of the present disclosure may be advantageously employed.

FIG. 8 is a block diagram showing an exemplary wireless communications system 800, in which an aspect of the present disclosure may be advantageously employed. For purposes of illustration, FIG. 8 shows three remote units 820, 830, and 850, and two base stations 840. It will be recognized that wireless communications systems may have many more remote units and base stations. Remote units 820, 830, and 850 include integrated circuit (IC) devices 825A, 825B, and 825C that include the disclosed hardware based address sanitizer (ASAN) engine. It will be recognized that other devices may also include the disclosed hardware based ASAN engine, such as the base stations, switching devices, and network equipment. FIG. 8 shows forward link signals 880 from the base stations 840 to the remote units 820, 830, and 850, and reverse link signals 890 from the remote units 820, 830, and 850 to the base stations 840.

In FIG. 8, remote unit 820 is shown as a mobile telephone, remote unit 830 is shown as a portable computer, and remote unit 850 is shown as a fixed location remote unit in a wireless local loop system. For example, the remote units may be a mobile phone, a hand-held personal communication systems (PCS) unit, a portable data unit, such as a personal data assistant, a GPS enabled device, a navigation device, a set top box, a music player, a video player, an entertainment unit, a fixed location data unit, such as meter reading equipment, or other device that stores or retrieves data or computer instructions, or combinations thereof. Although FIG. 8 illustrates remote units according to the aspects of the present disclosure, the disclosure is not limited to these exemplary illustrated units. Aspects of the present disclosure may be suitably employed in many devices, which include the disclosed hardware based ASAN engine.

Figure 9:
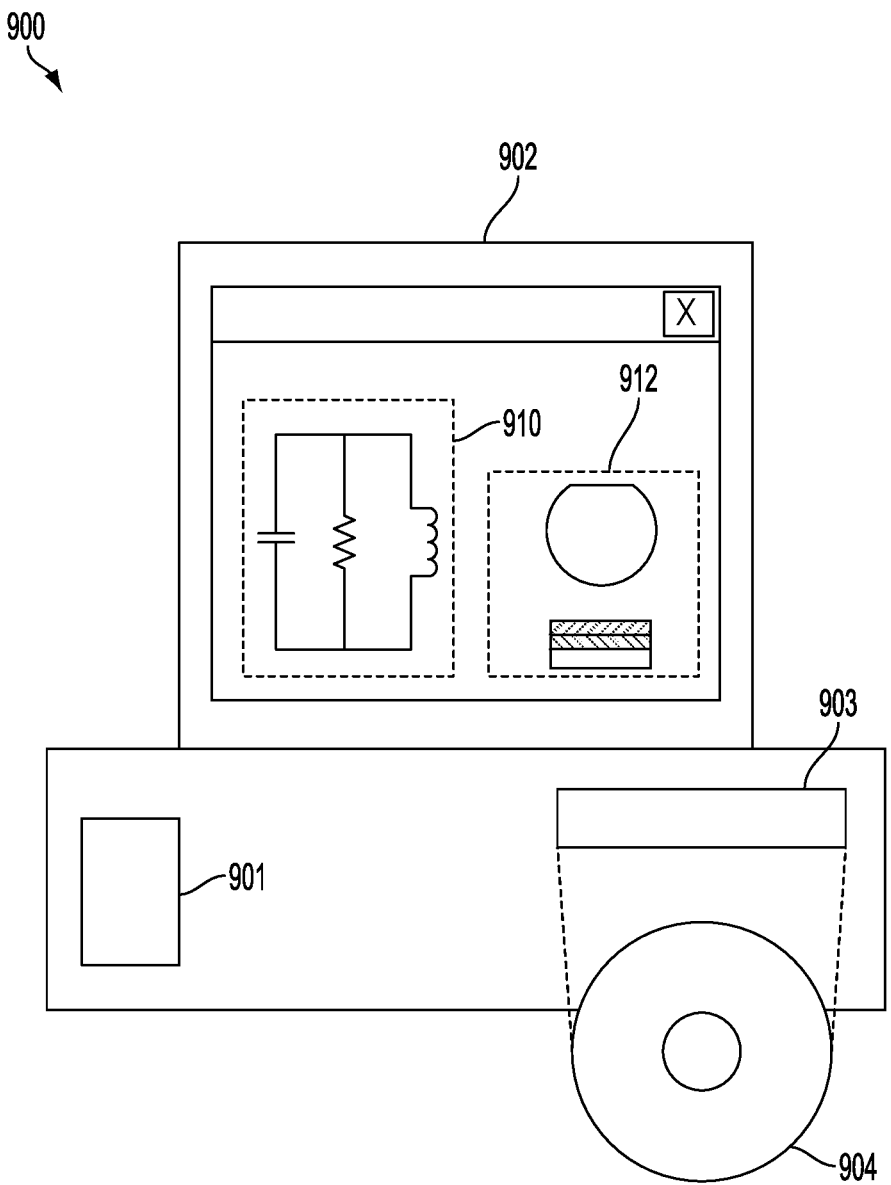
FIG. 9 is a block diagram illustrating a design workstation used for circuit, layout, and logic design of components, in accordance with various aspects of the present disclosure.

FIG. 9 is a block diagram illustrating a design workstation 900 used for circuit, layout, and logic design of a semiconductor component, such as the hardware based ASAN engine disclosed above. The design workstation 900 includes a hard disk 901 containing operating system software, support files, and design software such as Cadence or OrCAD. The design workstation 900 also includes a display 902 to facilitate design of a circuit 910 or a semiconductor component 912, such as the hardware based ASAN engine. A storage medium 904 is provided for tangibly storing the design of the circuit 910 or the semiconductor component 912 (e.g., the PLD). The design of the circuit 910 or the semiconductor component 912 may be stored on the storage medium 904 in a file format such as GDSII or GERBER. The storage medium 904 may be a CD-ROM, DVD, hard disk, flash memory, or other appropriate device. Furthermore, the design workstation 900 includes a drive apparatus 903 for accepting input from or writing output to the storage medium 904.

Data recorded on the storage medium 904 may specify logic circuit configurations, pattern data for photolithography masks, or mask pattern data for serial write tools such as electron beam lithography. The data may further include logic verification data such as timing diagrams or net circuits associated with logic simulations. Providing data on the storage medium 904 facilitates the design of the circuit 910 or the semiconductor component 912 by decreasing the number of processes for designing semiconductor wafers.

EXAMPLE ASPECTS

Aspect 1: An apparatus, comprising: a data memory region comprising a plurality of data symbols and a plurality of inaccessible zones, a first inaccessible zone placed before each of the plurality of data symbols and a second inaccessible zone placed after each of the plurality of data symbols; a shadow memory region corresponding to the data memory region, the shadow memory region including a plurality of data elements, each data element corresponding to one of the plurality of data symbols or one of the plurality of inaccessible zones, each data element indicating an accessibility state of a corresponding data symbol or inaccessible zone; and an address sanitizer hardware block within a processing core and coupled to the shadow memory region, the address sanitizer hardware block configured to check a selected data element of the shadow memory region corresponding to a selected data symbol or inaccessible zone being accessed, in order to determine the accessibility state of the selected data symbol or inaccessible zone, prior to accessing the selected data symbol or inaccessible zone.

Aspect 2: The apparatus of Aspect 1, in which the address sanitizer hardware block is further configured to convert a physical address of the selected data symbol or inaccessible zone into an index into the shadow memory region to fetch the selected data element in the shadow memory region.

Aspect 3: The apparatus of Aspect 1 or 2, in which the shadow memory resides in cache memory of the processing core.

Aspect 4: The apparatus of any of the preceding Aspects, in which each of the plurality of data symbols corresponds to a data cache line.

Aspect 5: The apparatus of any of the preceding Aspects, further comprising a level 2 (L2) cache configured to communicate with the address sanitizer hardware block in response to allocating the data cache line or evicting the data cache line, in order to determine the accessibility state of the data cache line.

Aspect 6: The apparatus of any of the preceding Aspects, in which the address sanitizer hardware block is configured to generate an exception in response to determining the accessibility state indicates inaccessibility.

Aspect 7: The apparatus of any of the preceding Aspects, in which the processing core is configured to instruct the address sanitizer hardware block to update the accessibility state of the selected data symbol in response to the data memory region comprising dynamic memory.

Aspect 8: A method implemented by an address sanitizer hardware block, comprising: checking a selected data element of a shadow memory region corresponding to a selected data symbol or inaccessible zone being accessed, a data memory region comprising a plurality of data symbols and a plurality of inaccessible zones, a first inaccessible zone placed before each of the plurality of data symbols and a second inaccessible zone placed after each of the plurality of data symbols, the shadow memory region corresponding to the data memory region, the shadow memory region including a plurality of data elements, each data element corresponding to one of the plurality of data symbols or one of the plurality of inaccessible zones, each data element indicating an accessibility state of a corresponding data symbol or inaccessible zone; and determining the accessibility state of the selected data symbol or inaccessible zone based on the checking, prior to accessing the selected data symbol or inaccessible zone.

Aspect 9: The method of Aspect 8, further comprising converting a physical address of the selected data symbol or inaccessible zone into an index into the shadow memory region to fetch the selected data element in the shadow memory region.

Aspect 10: The method of Aspect 8 or 9, in which the shadow memory resides in cache memory of a processing core.

Aspect 11: The method of any of the Aspects 8-10, in which each of the plurality of data symbols corresponds to a data cache line.

Aspect 12: The method of any of the Aspects 8-11, in which determining the accessibility state of the data cache line further comprising communicate from a level 2 (L2) cache to the address sanitizer hardware block in response to allocating the data cache line or evicting the data cache line.

Aspect 13: The method of any of the Aspects 8-12, further comprising generating an exception in response to determining the accessibility state indicates inaccessibility.

Aspect 14: The method of any of the Aspects 8-13, further comprising instructing the address sanitizer hardware block to update the accessibility state of the selected data symbol in response to the data memory region comprising dynamic memory.

Aspect 15: An apparatus by an address sanitizer hardware block, comprising: at least one memory; and at least one processor coupled to the at least one memory including a shadow memory region and a data memory region, the at least one processor configured: to check a selected data element of the shadow memory region corresponding to a selected data symbol or inaccessible zone being accessed, the data memory region comprising a plurality of data symbols and a plurality of inaccessible zones, a first inaccessible zone placed before each of the plurality of data symbols and a second inaccessible zone placed after each of the plurality of data symbols, the shadow memory region corresponding to the data memory region, the shadow memory region including a plurality of data elements, each data element corresponding to one of the plurality of data symbols or one of the plurality of inaccessible zones, each data element indicating an accessibility state of a corresponding data symbol or inaccessible zone; and to determine the accessibility state of the selected data symbol or inaccessible zone based on the checking, prior to accessing the selected data symbol or inaccessible zone.

Aspect 16: The apparatus of Aspect 15, in which the at least one processor is further configured to convert a physical address of the selected data symbol or inaccessible zone into an index into the shadow memory region to fetch the selected data element in the shadow memory region.

Aspect 17: The apparatus of Aspect 15 or 16, in which the shadow memory resides in cache memory of a processing core.

Aspect 18: The apparatus of any of the Aspects 15-17, in which the each of the plurality of data symbols corresponds to a data cache line.

Aspect 19: The apparatus of any of the Aspects 15-18, in which the at least one processor is further configured to communicate from a level 2 (L2) cache to the address sanitizer hardware block in response to allocating the data cache line or evicting the data cache line.

Aspect 20: The apparatus of any of the Aspects 15-19, in which the at least one processor is further configured to generate an exception in response to determining the accessibility state indicates inaccessibility.

For a firmware and/or software implementation, the methodologies may be implemented with modules (e.g., procedures, functions, and so on) that perform the functions described. A machine-readable medium tangibly embodying instructions may be used in implementing the methodologies described. For example, software codes may be stored in a memory and executed by a processor unit. Memory may be implemented within the processor unit or external to the processor unit. As used, the term "memory" refers to types of long term, short term, volatile, nonvolatile, or other memory and is not limited to a particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include random access memory (RAM), read-only memory (ROM), electrically erasable read-only memory (EEPROM), compact disc read-only memory (CD-ROM) or other optical disk storage, magnetic disk storage or other magnetic storage devices, or other medium that can be used to store desired program code in the form of instructions or data structures and that can be accessed by a computer. Disk and disc, as used, include compact disc (CD), laser disc, optical disc, digital versatile disc (DVD), floppy disk, and Blu-ray® disc, where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communications apparatus. For example, a communications apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions, and alterations can be made without departing from the technology of the disclosure as defined by the appended claims. For example, relational terms, such as "above" and "below" are used with respect to a substrate or electronic device. Of course, if the substrate or electronic device is inverted, above becomes below, and vice versa. Additionally, if oriented sideways, above and below may refer to sides of a substrate or electronic device. Moreover, the scope of the present disclosure is not intended to be limited to the particular configurations of the process, machine, manufacture, composition of matter, means, methods, and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding configurations described may be utilized according to the present disclosure. Accordingly, the appended claims are intended to include within their scope such processes, machines, manufacture, compositions of matter, means, methods, or steps.

Those of skill would further appreciate that the various illustrative logical blocks, modules, circuits, and algorithm steps described in connection with the present disclosure may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure may be implemented or performed with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in RAM, flash memory, ROM, erasable programmable read-only memory (EPROM), EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the present disclosure is provided to enable any person skilled in the art to make or use the present disclosure. Various modifications to the disclosure will be readily apparent to those skilled in the art, and the generic principles defined may be applied to other variations without departing from the spirit or scope of the disclosure. Thus, the present disclosure is not intended to be limited to the examples and designs described, but is to be accorded the widest scope consistent with the principles and novel features disclosed.

What is claimed is:

1. An apparatus, comprising:
   a data memory region comprising a plurality of data symbols and a plurality of inaccessible zones, a first inaccessible zone placed before each of the plurality of data symbols and a second inaccessible zone placed after each of the plurality of data symbols;
   a shadow memory region corresponding to the data memory region, the shadow memory region including a plurality of data elements, each data element corresponding to one of the plurality of data symbols or one of the plurality of inaccessible zones, each data element indicating an accessibility state of a corresponding data symbol or inaccessible zone, each data element further indicating whether the corresponding data symbol has been previously accessed; and
   an address sanitizer hardware block within a processing core and coupled to the shadow memory region, the address sanitizer hardware block configured to check a selected data element of the shadow memory region corresponding to a selected data symbol or inaccessible zone being accessed, in order to determine the accessibility state of the selected data symbol or inaccessible zone, prior to accessing the selected data symbol or inaccessible zone.

2. The apparatus of claim 1, in which the address sanitizer hardware block is further configured to convert a physical address of the selected data symbol or inaccessible zone into an index into the shadow memory region to fetch the selected data element in the shadow memory region.

3. The apparatus of claim 1, in which the shadow memory resides in cache memory of the processing core.

4. The apparatus of claim 1, in which each of the plurality of data symbols corresponds to a data cache line.

5. The apparatus of claim 4, further comprising a level 2 (L2) cache configured to communicate with the address sanitizer hardware block in response to allocating the data cache line or evicting the data cache line, in order to determine the accessibility state of the data cache line.

6. The apparatus of claim 1, in which the address sanitizer hardware block is configured to generate an exception in response to determining the accessibility state indicates inaccessibility.

7. The apparatus of claim 1, in which the processing core is configured to instruct the address sanitizer hardware block to update the accessibility state of the selected data symbol in response to the data memory region comprising dynamic memory.

8. A method implemented by an address sanitizer hardware block, comprising:
   checking a selected data element of a shadow memory region corresponding to a selected data symbol or inaccessible zone being accessed, a data memory region comprising a plurality of data symbols and a plurality of inaccessible zones, a first inaccessible zone placed before each of the plurality of data symbols and a second inaccessible zone placed after each of the plurality of data symbols, the shadow memory region corresponding to the data memory region, the shadow memory region including a plurality of data elements, each data element corresponding to one of the plurality of data symbols or one of the plurality of inaccessible zones, each data element indicating an accessibility state of a corresponding data symbol or inaccessible zone, each data element further indicating whether the corresponding data symbol has been previously accessed; and
   determining the accessibility state of the selected data symbol or inaccessible zone based on the checking, prior to accessing the selected data symbol or inaccessible zone.

9. The method of claim 8, further comprising converting a physical address of the selected data symbol or inaccessible zone into an index into the shadow memory region to fetch the selected data element in the shadow memory region.

10. The method of claim 8, in which the shadow memory resides in cache memory of a processing core.

11. The method of claim 8, in which each of the plurality of data symbols corresponds to a data cache line.

12. The method of claim 11, in which determining the accessibility state of the data cache line further comprising communicate from a level 2 (L2) cache to the address sanitizer hardware block in response to allocating the data cache line or evicting the data cache line.

13. The method of claim 8, further comprising generating an exception in response to determining the accessibility state indicates inaccessibility.

14. The method of claim 8, further comprising instructing the address sanitizer hardware block to update the accessibility state of the selected data symbol in response to the data memory region comprising dynamic memory.

15. An apparatus by an address sanitizer hardware block, comprising:
   at least one memory including a shadow memory region and a data memory region; and
   at least one processor coupled to the at least one memory, the at least one processor configured:
   to check a selected data element of the shadow memory region corresponding to a selected data symbol or inaccessible zone being accessed, the data memory region comprising a plurality of data symbols and a plurality of inaccessible zones, a first inaccessible zone placed before each of the plurality of data symbols and a second inaccessible zone placed after each of the plurality of data symbols, the shadow memory region corresponding to the data memory region, the shadow memory region including a plurality of data elements, each data element corresponding to one of the plurality of data symbols or one of the plurality of inaccessible zones, each data element indicating an accessibility state of a corresponding data symbol or inaccessible zone, each data element further indicating whether the corresponding data symbol has been previously accessed; and to determine the accessibility state of the selected data symbol or inaccessible zone based on the checking, prior to accessing the selected data symbol or inaccessible zone.

16. The apparatus of claim 15, in which the at least one processor is further configured to convert a physical address of the selected data symbol or inaccessible zone into an index into the shadow memory region to fetch the selected data element in the shadow memory region.

17. The apparatus of claim 15, in which the shadow memory resides in cache memory of a processing core.

18. The apparatus of claim 15, in which each of the plurality of data symbols corresponds to a data cache line.

19. The apparatus of claim 18, further comprising a level 2 (L2) cache configured to communicate with the address sanitizer hardware block in response to allocating the data cache line or evicting the data cache line.

20. The apparatus of claim 15, in which the at least one processor is further configured to generate an exception in response to determining the accessibility state indicates inaccessibility.

* * * * *